(12) United States Patent
Omi

(10) Patent No.: US 6,876,921 B2
(45) Date of Patent: Apr. 5, 2005

(54) CAR NAVIGATION SYSTEM

(75) Inventor: Masanori Omi, Gifu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/683,220

(22) Filed: Oct. 14, 2003

(65) Prior Publication Data

US 2004/0088106 A1 May 6, 2004

(30) Foreign Application Priority Data

Nov. 1, 2002 (JP) ........................................ 2002-320018

(51) Int. Cl.⁷ .............................................. G06G 7/78
(52) U.S. Cl. .................... 701/207; 701/210; 701/208; 701/209; 701/211; 701/213; 340/995.19
(58) Field of Search ............................... 701/200, 201, 701/203, 204, 205, 206, 207, 208, 209, 210, 211, 212, 213; 340/988, 990, 995

(56) References Cited

U.S. PATENT DOCUMENTS

| 5,787,383 | A | * | 7/1998 | Moroto et al. ............... 701/210 |
| 5,928,307 | A | | 7/1999 | Oshizawa et al. |
| 5,938,720 | A | * | 8/1999 | Tamai ......................... 701/209 |
| 6,118,389 | A | | 9/2000 | Kamada et al. |
| 6,542,816 | B1 | * | 4/2003 | Ito et al. ...................... 701/209 |
| 6,687,615 | B1 | * | 2/2004 | Krull et al. .................. 701/210 |
| 6,701,250 | B1 | * | 3/2004 | Rychlak ...................... 701/210 |

FOREIGN PATENT DOCUMENTS

| JP | A-H08-30896 | 2/1996 |
| JP | A-H08-136277 | 5/1996 |
| JP | A-H08-292058 | 11/1996 |
| JP | A-2002-122438 | 4/2002 |

* cited by examiner

Primary Examiner—Richard M. Camby
(74) Attorney, Agent, or Firm—Posz Law Group, PLC

(57) ABSTRACT

A first recommended route is computed as having the minimum cost from a start point to an end point as a destination. The first recommended route is then divided by using each road name. Here, Tomei Expressway occupies 60% or more in the entire traveling length of the first recommended route while National Road No. 1 occupies 10% or more in the entire traveling length of the first recommended route. A link cost of Tomei Expressway is thereby multiplied by 1.5, while a link cost of National Road No. 1 is thereby multiplied by 1.2. Another route from the start point to the end point is re-computed by using the changed link costs. A detour avoiding Tomei Expressway and National Road No. 1 is thereby designated.

20 Claims, 8 Drawing Sheets

| No. |
| :---: |
| LINK ID |
| LINK LENGTH |
| START (X,Y) |
| END (X,Y) |
| ROAD NAME |
| ROAD No. |
| ROAD KIND |
| ROAD WIDTH |

1st TOTAL: 140km

| ROAD NAME | LENGTH (km) | |
|---|---|---|
| TOMEI EWY | 100 | → ≧60% (×1.5) |
| NR NO.1 | 20 | → ≧10% (×1.2) |
| (START to A) | 10 | |
| (C to END) | 10 | |

1st TOTAL: 140km

| ROAD NAME | LENGTH (km) | |
|---|---|---|
| TOMEI EWY | 100 | ×1.5 |
| NR NO.1 | 20 | ×1.2 |
| (START to A) | 10 | ×1.0 |
| (C to END) | 10 | ×1.0 |

1st TOTAL: 140km

| | ORDER | ROAD NAME | LENGTH (km) |
|---|---|---|---|
| TARGET { | 1 | TOMEI EWY | 100 |
| | 2 | NR NO.1 | 20 |
| | 3 | (START to A) | 10 |
| | 4 | (C to END) | 10 |

| DETOUR MENU | | |
|---|---|---|
| ROAD NAME | LENGTH (km) | TARGET |
| START to NR NO.1 | 10 | NO |
| NR NO.1 | 20 | YES |
| TOMEI EWY | 100 | YES |
| TOMEI EWY to END | 10 | NO |

CAR NAVIGATION SYSTEM

CROSS REFERENCE TO RELATED APPLICATIONS

This application is based on and incorporates herein by reference Japanese Patent Application No. 2002-320018 filed on Nov. 1, 2002.

FIELD OF THE INVENTION

The present invention relates to a car navigation system. In particular, it relates to a car navigation system that can avoid a major road in re-computing a route even when the major road is not located around a linear center of the route.

BACKGROUND OF THE INVENTION

Some car navigation systems can designate a detour to a destination. (Refer to Patent 1: JP-A-H8-233589 (U.S. Pat. No. 6,118,389).) According to a car navigation disclosed in Patent 1, a route from a star point to an end point as a destination is set by using evaluation values assigned to links constituting a road map. A detour for the route is calculated by lowering the evaluation values of the links included in the previously set route to prevent the same from being set again.

However, in the above method for setting a detour, all the evaluation values are simultaneously lowered in all the links within a given region ahead in the route to the end point. For instance, even when a user wants to use the same route at least in regions surrounding a start point and a destination, with using the above method a different route is undesirably designated in the regions surrounding the start point and the destination. To solve this problem, a method sets a route by using evaluation values that are changed based on a traveling length (or traveling distance) from the start point or the destination. (Refer to Patent 2: JP-A-H8-292058.)

According to a car navigation system disclosed in Patent 2, position relation is considered within a previously set route. Namely, costs of the links, which act as negative evaluation values, around a linear center (or around an intermediate region) of the route are remarkably changed with increasing multiplying powers of coefficients, while costs in the regions around the start point and the destination are hardly changed. Differentiation from the previous route is thereby strengthened around the linear center of the route while being prevented in the regions around the start point and the destination. This leads to designating a detour that is differentiated around the linear center of the previously set route.

However, in the above method, as long as a major road such as an expressway or a national road is not located around the linear center of a route, the major road cannot be eventually avoided.

SUMMARY OF THE INVENTION

It is an object of the present invention to provide a car navigation system that can avoid a major road in re-computing a route even when the major road is not located around a linear center of the route.

To achieve the above object, a car navigation system is provided with the following. A storage unit stores a plurality of pieces of link information that relates to a link and has a link cost. Here, a route from a start point to an end point is constituted by roads, while a road is constituted by links. The road can be thereby indicated on a map by using the link information. A recommended route is computed so that a total of link costs included in the recommended route is smaller than a total of link costs included in any other route from the start point to the end point. Routing assistance from the start point to the end point can be executed according to the recommended route. When re-computation of the recommended route is commanded, each of the link costs included in the recommended route is increased based on a traveling length of a corresponding road. The recommended route is then re-computed by using the increased link costs.

According to the above-mentioned car navigation system, link costs included in the recommended route can be increased based on a traveling length before the recommended route is re-computed. For instance, when an expressway is included in the recommended route and a user wants to avoid the expressway, a major road such as an expressway tends to become the longest road among the roads constituting the recommended route. Therefore, increasing of a cost of the longest road can result in avoiding the major road when the recommended route is re-computed.

In another aspect of the present invention, a car navigation is provided with the following. A storage unit stores a plurality of pieces of link information that relates to a link and has a link cost. Here, a route from a start point to an end point is constituted by roads, while a road is constituted by links. The road can be thereby indicated on a map by using the link information. A recommended route is computed so that a total of link costs included in the recommended route is smaller than a total of link costs included in any other route from the start point to the end point. Routing assistance from the start point to the end point can be executed according to the recommended route. Each of the link costs is changed by multiplying a multiplier after dividing based on a divisor the recommended route into sections, each of which has a traveling length ratio relative to an entire traveling length of the recommended route. Here, the multiplier is assigned to each of the sections. An input unit is furthermore provided so that a user can input a value for at least one of the multiplier, the divisor, and the traveling length ratio. The recommended route is then re-computed by using the increased link costs.

According to the above-mentioned car navigation, a user can set one of the multiplier, the divisor, and the traveling length ratio, so that the recommended route can be re-computed as meeting a purpose of the user.

In yet another aspect of the present invention, a car navigation is provided with the following. A storage unit stores a plurality of pieces of link information that relates to a link and has a link cost. Here, a route from a start point to an end point is constituted by roads, while a road is constituted by links. The road can be thereby indicated on a map by using the link information. A recommended route is computed so that a total of link costs included in the recommended route is smaller than a total of link costs included in any other route from the start point to the end point. Routing assistance from the start point to the end point can be executed according to the recommended route. Each of the link costs is changed by multiplying a multiplier after dividing based on a divisor the recommended route into sections, each of which has a traveling length ratio relative to an entire traveling length of the recommended route. The multiplier is assigned to each of the sections. Here, at least one of the multiplier, the divisor, and the traveling length ratio is changed based on the entire traveling length of the recommended route. The recommended route is then re-computed by using the increased link costs.

According to the above-mentioned car navigation, for instance, when an entire traveling length of the recommended route is long, a divisor is increased so that meticulous setting can be possible for changing link costs included in the sections. Multipliers assigned to links around a linear center of the recommended route can be increased, while multipliers assigned to links around a start point and an end point can be decreased. This enables a major road included around a linear center of the recommended route to be avoided in re-computing the recommended route. Furthermore, when the entire traveling length of the recommended route is short, a traveling length ratio of a section can be set to smaller in a region around the linear center of the recommended route than in regions around a start point and an end point of the recommended route. This enables link costs included around the linear center of the recommended route to be meticulously changed, so that a road around the linear center of the recommended route can be preferentially avoided in re-computation of the recommended route.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
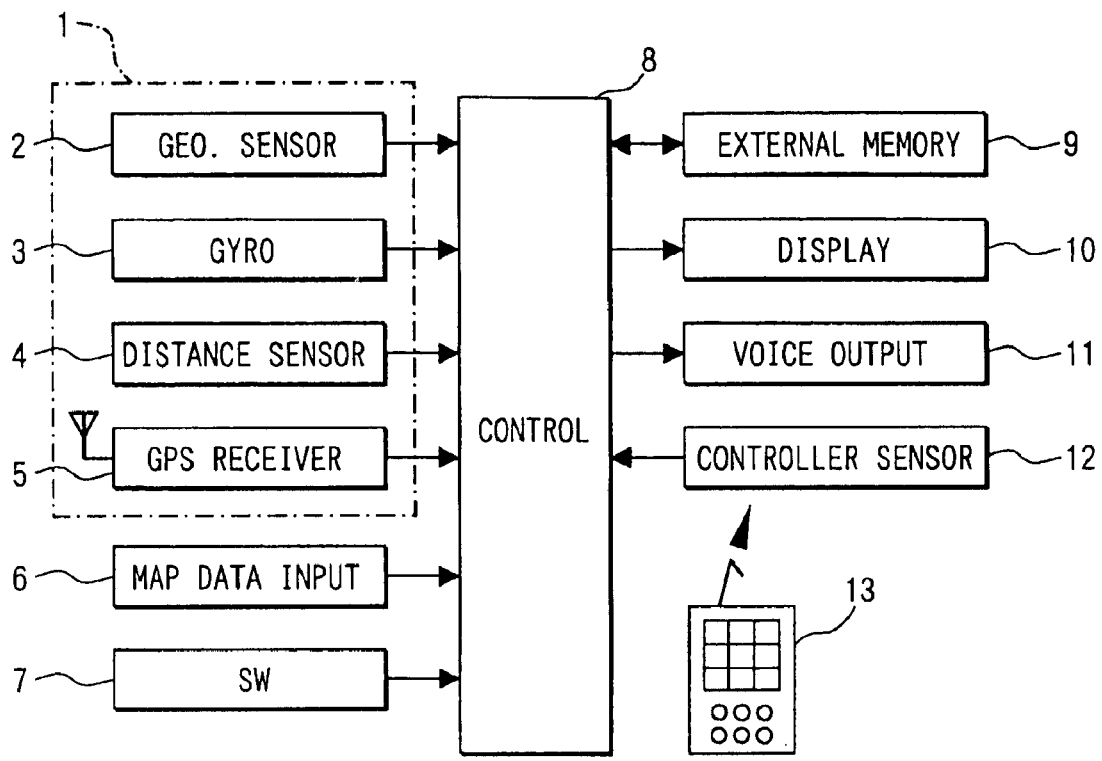
FIG. 1 is a schematic block diagram showing overall structure of a car navigation system according to an embodiment of the present invention.

A car navigation system according to an embodiment of the present invention will be explained with reference to drawings. FIG. 1 is a block diagram schematically showing overall structure of a car navigation system. As shown in the figure, the car navigation system mounted in a vehicle includes a position detector 1, a map data input unit 6, a manipulation switch group 7, an external memory 9, a display unit 10, a voice output unit 11, a remote controller sensor 12, and a control circuit 8 connected with the preceding components.

The control circuit 8 is constructed as being a common computer having CPU, ROM, RAM, I/O, a bus that is connected with the preceding components. ROM is stored with an executable program by the control circuit 8. According to the executable program, CPU executes a given computation. Here, the executable program can be externally obtained through the external memory 9.

The position detector 1 includes a geomagnetism sensor 2, a gyroscope 3, a distance sensor 4, a GPS (Global Positioning System) receiver 5, or the like. The GPS receiver 5 detects the present position of the vehicle based on a radio wave from GPS satellites. Each sensor 2 to 5 has a different characteristic and detection accuracy, so that high position detection accuracy is obtained by adjusting the respective errors through combining the sensors 2 to 5. Here, a required accuracy level may properly select some of the sensors 2 to 5 instead of selecting all the sensors 2 to 5. Furthermore, the position detector 1 can include a rotation sensor detecting a steering position, a speed sensor of each drive wheel, or the like.

The map data input unit 6 is for inputting map data such as road map data, background data, landmark data, and the like. A map data recoding medium is used for storing the map data. The map data recoding medium includes a playback-only type such as DVD-ROM or CD-ROM and furthermore a rewritable type such as memory card or hard disk. Here, link information and node information that constitute the map data will be explained below.

Figures 4, 5:
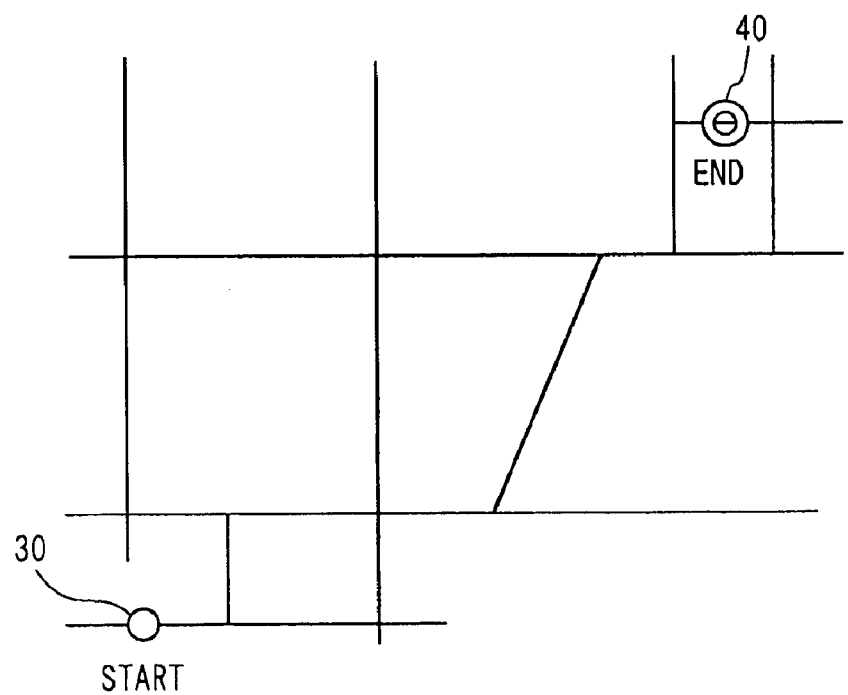
FIG. 4 is a schematic diagram showing structure of link information according to the embodiment.
FIG. 5 is a schematic diagram showing a map including a start point and an end point as a destination according to the embodiment.

First of all, each road on a map is divided by nodes that are points of intersections, branch points, junctions, and the like. Links are defined as lines between the nodes. Connecting the links leads to constituting a road. A format of link information of a link is shown in FIG. 4. The link information includes the following; a link ID uniquely assigned to each link; a link traveling length of the link; coordinates of start and end points; a road name such as Tomei Expressway, Meishin Expressway, or the like, a road kind such as an expressway, a toll road, local road, or the like; a road number such as National Road No.1, Prefecture Road No. 56, Town Road No. 32, or the like assigned by a national or local government; and a width of the link. Here, the link IDs included in the same road are favorably assigned in a serial order.

By contrast, node information of the node (not shown) includes a node ID uniquely assigned to each node; coordinates of the node; a node name; link IDs of all links connected with the node; an intersection kind; or the like.

The manipulation switch group 7 includes a touch panel switch that is integrated with the display unit 10 or mechanical switches to be used for various input.

The display unit 10 includes an LCD (Liquid Crystal Display) for displaying: an own vehicle mark that is displayed based on the present position detected by the position detector 1; and a map surrounding the vehicle generated by using the map data, background data, landmark data, or the like inputted from the map data input unit 6. The display unit 10 can furthermore display the map with changing a scale size or with scrolling through the manipulation switch group 7 or a remote controller 13, to be explained below.

The voice output unit 11 is constituted by a speaker, an audio amplifier, or the like. The remote controller sensor 12 receives various manipulation signals from the remote controller 13 to output to the control circuit 8.

The car navigation system of the embodiment has a function of routing assistance. In this function, when a destination is inputted through the manipulation switch group 7 or remote controller 13, a guide route is computed and displayed on the display unit 10 through automatically searching for the most appropriate route from the present position as a start point to the destination as an end point by using the above map data. A method for automatically designating the most appropriate route executes evaluation value computation using link traveling lengths, road kinds, road widths, or the like such as cost computation by known Dijkstra Method. The cost computation of the embodiment will be explained below.

At the beginning, map data covering from a start point to a destination as an end point is read out from the map data input unit 6 to be stored in the RAM or the like in the control circuit 8. By using the stored map data, a route is set as having the minimum cost from the start point to the destination.

For instance, as shown in FIG. 5, when a route is set from a start point 30 to an end point 40, a cost of the start point 30 is set to zero and other intersections (nodes) remain unset. A cost of any intersection being reached from the start point 30 is set by summing costs of roads that can be used (cost spreading from the start point). In the next place, cost spreading is executed from the newly cost set intersection to a next intersection being reached from the newly cost set intersection. The cost spreading is continued till a new cost can be set no more to all intersections or till a cost of the destination 40 changes no more.

Figure 6:
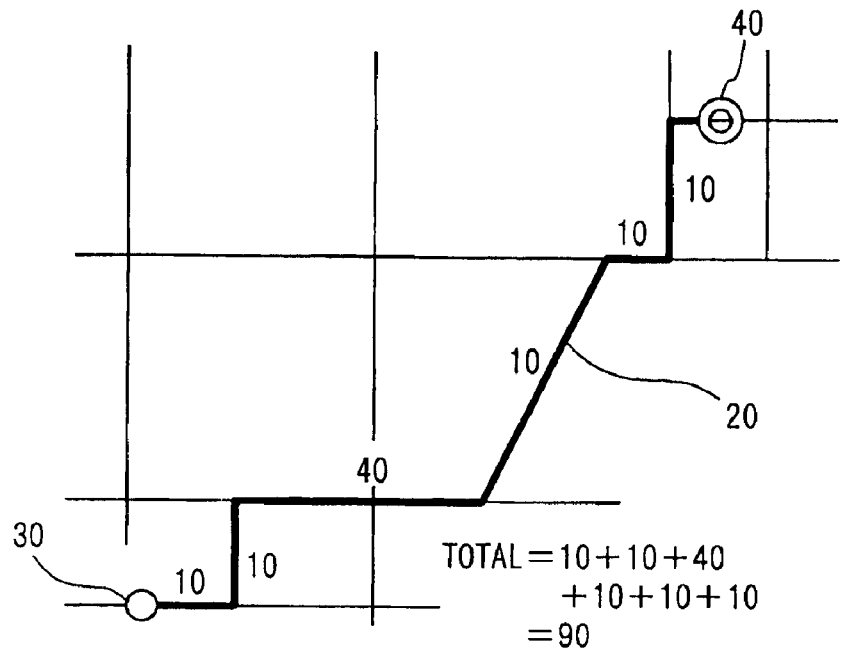
FIG. 6 is a schematic diagram showing a first recommended route according to the embodiment.
Figure 7:
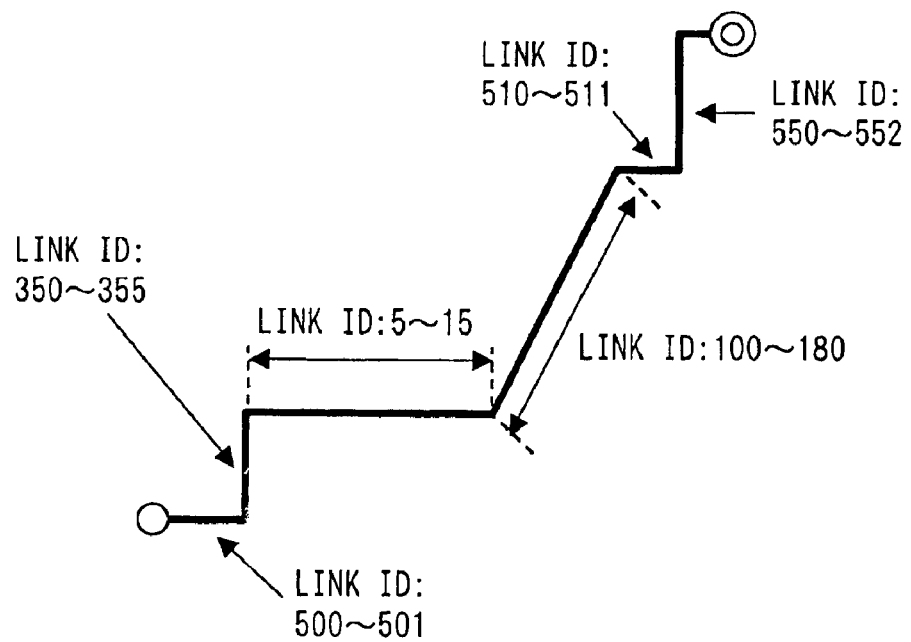
FIG. 7 is a schematic diagram showing link IDs constituting a first recommended route according to the embodiment.

Thereby, a route having the minimum cost from the start point 30 to the destination 40 is eventually designated as a destination route. In the embodiment, as shown in FIG. 6, the first recommended route 20 has the minimum total (90) of the costs of the links constituting a route from the start point 30 to the destination 40. The first recommended route 20 is specified as a sequence of plural link IDs as shown in FIG. 7 to be stored in the RAM of the control circuit 8.

In the next place, re-computing processing for avoiding a major road within the first recommended route will be explained with reference to FIGS. 2, 3.

Figure 2:
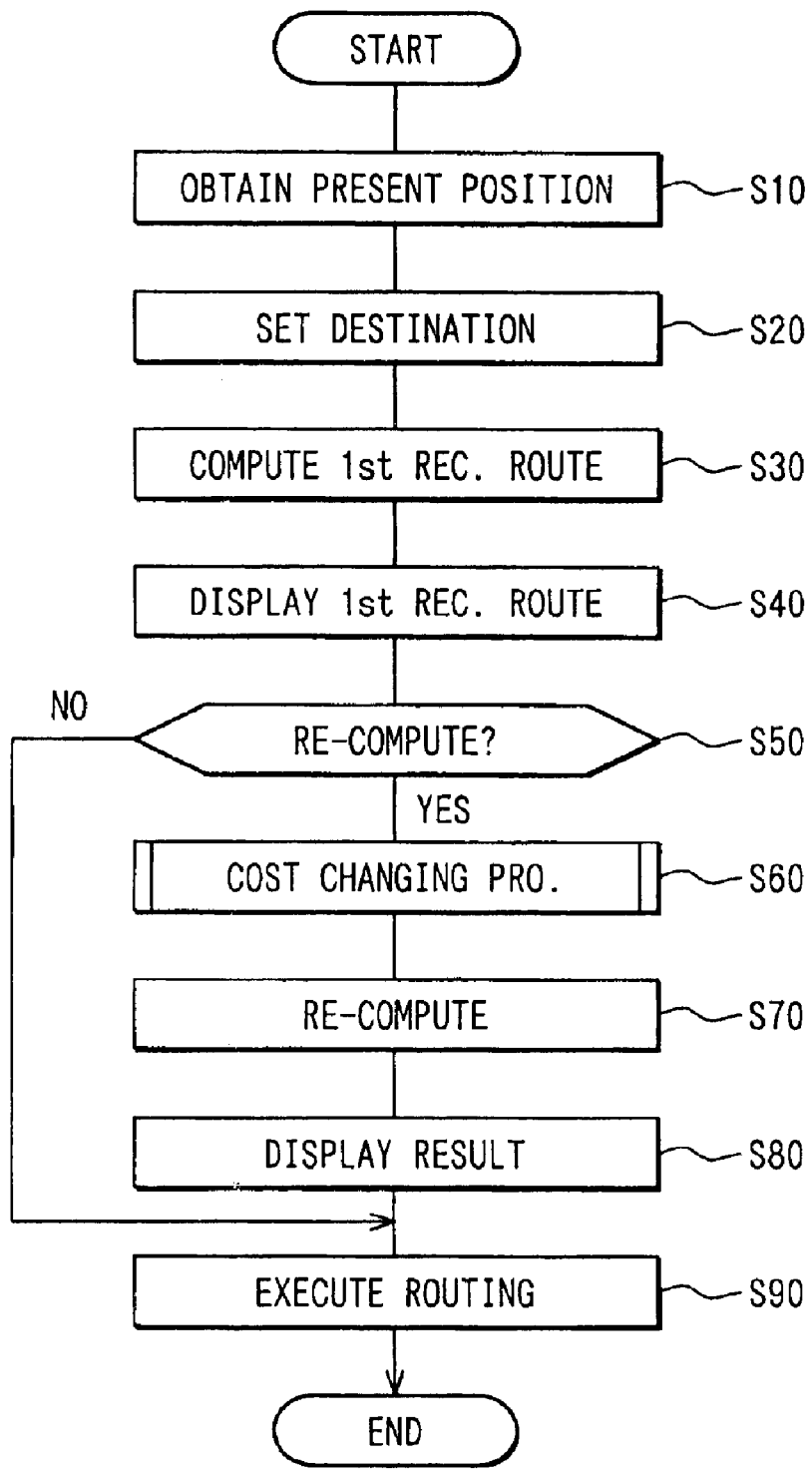
FIG. 2 is a flowchart diagram explaining re-computing processing of a first recommended route according to the embodiment.

At Step 10 in FIG. 2, the present position as a start point is obtained. At Step 20, a destination is set through the manipulation switch group 7, the remote controller 13, or the like. At Step 30, as explained above, the first recommended route is computed as having the minimum cost from the start point to the destination. At Step 40, the computed first recommended route is displayed on the display unit 10.

At Step 50, a user is asked whether re-computation is requested for the first recommended route displayed on the display unit 10. Here, "[i]s a different route requested?" or the like is shown on the display unit 10. When the re-computation is requested by the user, the processing proceeds to Step 60. Otherwise, the processing proceeds to Step 90.

Here, the re-computation is executed with being requested by the user. However, it can be executed without being requested when simultaneous computation of plural routes is previously designed to be executed.

At Step 60, cost changing processing to be explained later is executed. At Step 70, re-computation of the first recommended route is executed by using the changed costs in the cost changing processing. At Step 80, a re-computed route is displayed on the display unit 10, and at Step 90 routing assistance is executed up to the destination based on the displayed guide route.

The cost changing processing, being a feature of the embodiment, will be explained below with reference to FIG. 3. At Step 100, roads (a road sub-group) constituting the first recommended route computed at Step 30 (or the link information corresponding to the first recommended route stored in the RAM) are extracted.

Figures 8, 9:
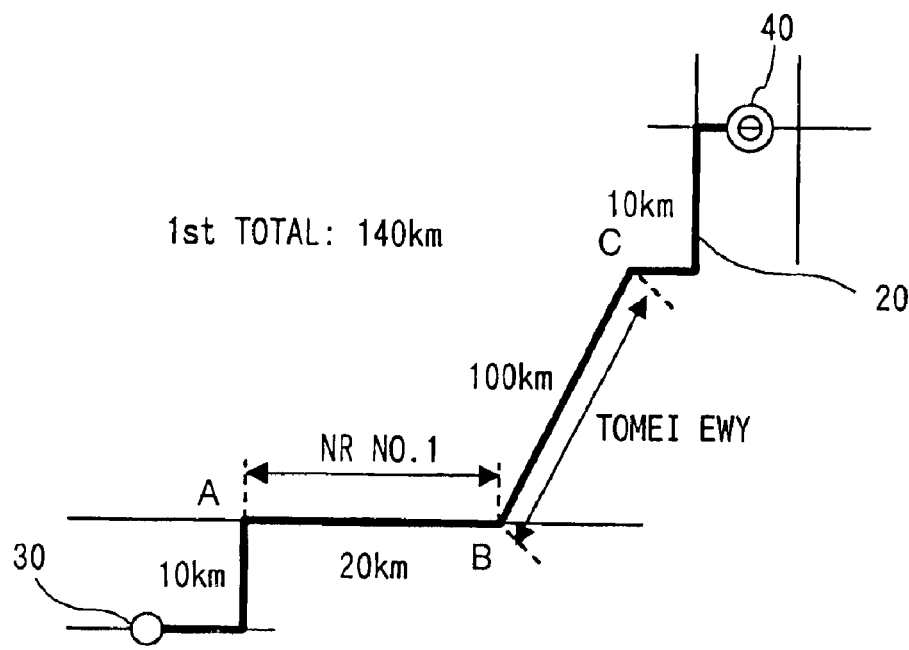
FIG. 8 is a schematic diagram showing road names constituting a first recommended route according to the embodiment.
FIG. 9 is a table showing a list of road names included in a first recommended route according to the embodiment.

At Step 200, plural links that have the same road name are recognized as one road with considering the road names of the links within the extracted link data. The first recommended route is divided into plural roads (a recommend road sub-group), each of which has a different road name. In the embodiment, as shown in FIG. 8, the recommended route is divided into four roads (i.e, Tomei Expressway (EWY) (B to C); Nation Road No. 1 (A to B); and two roads having no specific names (start point 30 to A, C to end point 40)) by considering the road names. Here, the road having no specific name can be recognized as one road, to be explained later, by the link IDs possessed by the road having no specific name.

In the embodiment, the road names are used for dividing the recommended route, but other items of the link information such as the road kind, road number, or the like can be used for dividing the recommended route.

The link IDs are assigned to links that have the same road name as being as serial as possible, as explained above. The links having the serial link IDs (link ID sequence) can be recognized as one road. The recommended route can be therefore divided into the plural roads by using the link IDs. In the embodiment, as shown in FIG. 7, the recommended route can be divided into six link ID sequences (5 to 15, 100 to 180, 350 to 355, 500 to 501, 550 to 552) by considering the link ID sequence.

At Step 300, a traveling length is computed for each of the roads recognized at Step 200, and an entire traveling length is also computed for the first recommended route. In the embodiment, as shown in FIG. 9, the entire traveling length of the first recommended route is 140 km. The traveling lengths of Tomei Expressway, National Road No. 1, a section from the start point to A, and a section from C to the destination are 100 km, 20 km, 10 km, and 10 km, respectively.

At Step 400, based on the traveling lengths, a road is designated for changing a cost. In the embodiment, a road occupying 10 percent or more in the entire traveling length of the route is designated for changing the cost. Tomei Expressway and National Road No. 1 are thus designated.

Furthermore, a given coefficient (or multiplier) is multiplied for each designated road to change the cost. In the embodiment, a cost of a road that occupies 60 percent or more in the entire traveling length of a route is multiplied by 1.5 time, while a cost of a road that occupies 10 percent or more is multiplied by 1.2 time. In the embodiment, the cost of Tomei Expressway becomes 15 of 1.5 time from 10, while that of National Road No. 1 becomes 48 of 1.2 time from 40.

Subsequently, the re-computation of the first recommended route is executed at Step 70 by using the changed costs, so that a different route 20a from the first recommended route 20 is designated. Major roads such as Tomei Expressway and the like are thereby avoided.

As explained above, according to the car navigation of the embodiment, a cost of a road that occupies a given percentage or more in the entire traveling length of a route is increased in re-computation of the first recommended route. This results in that the road whose cost is increased is hindered from being included in the roads constituting the route. A finally computed route (second recommended route) can thereby avoid a major road that mainly occupies the first recommended route.

First Modification

Figure 3:
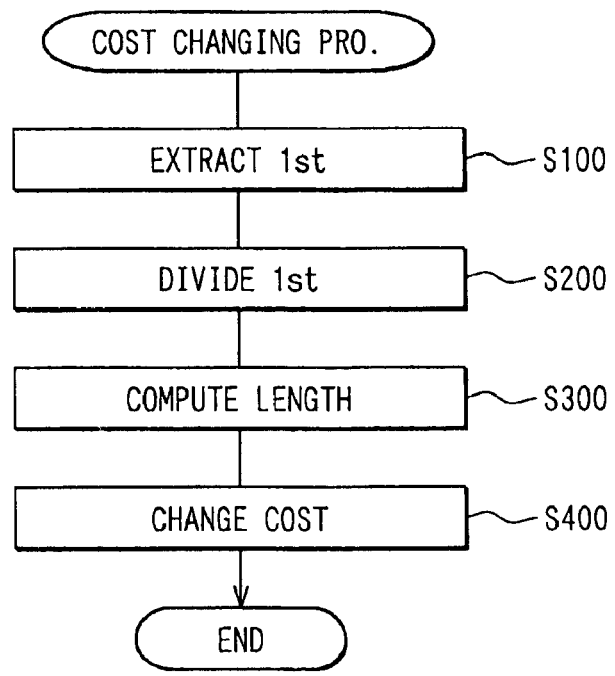
FIG. 3 is a flowchart diagram explaining cost changing processing according to the embodiment.

In the embodiment, at Step 400 in FIG. 3, cost changing is executed for a road that occupies the given percentage or more of the entire traveling length of the first recommended route. However, cost changing can be executed for all roads with changing the respective coefficients that increase with increasing traveling length.

Figures 10, 11:
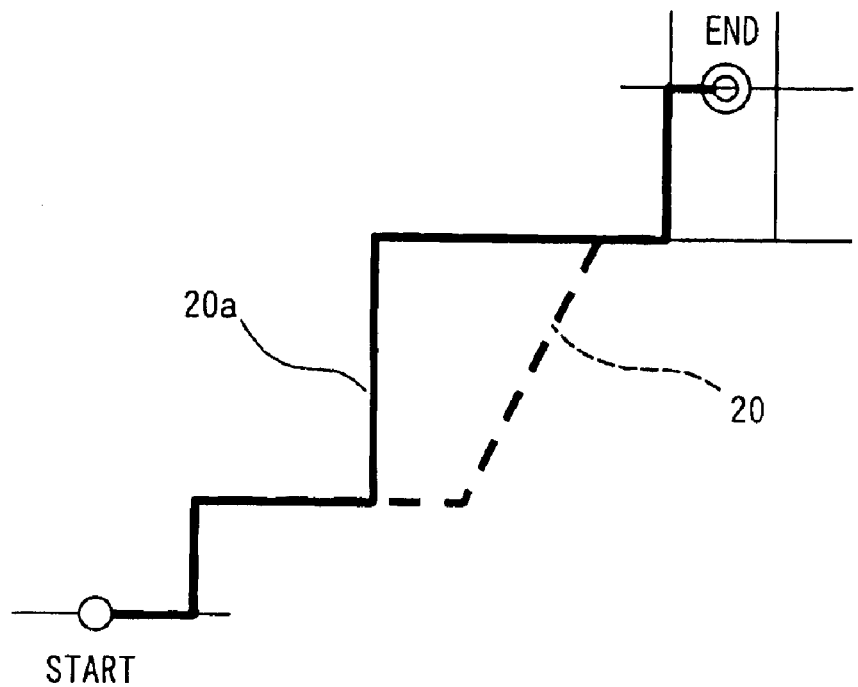
FIG. 10 is a schematic diagram showing a detour from a first recommended route according to the embodiment.
FIG. 11 is a table showing change coefficients assigned to roads according to a first modification of the embodiment.

Namely, as shown in FIG. 11, for the first recommended route, the largest coefficient (e.g., 1.5) is assigned to Tomei Expressway that has the longest traveling length within the route so as to change the cost by the largest increase. By contrast, the second largest coefficient (e.g., 1.2) is assigned to National Road No. 1 that has the second longest traveling length so as to change the cost by the second largest increase. To the sections from the start point to A and from C to the destination, a coefficient of one is assigned. Subsequently, the different route is computed by using the changed costs. When a major road such as Tomei Expressway, National Road, or the like that has a long traveling length is included in the first recommended route, the major roads tend to be eliminated in re-computation of the first recommended route.

Figures 12, 13, 14:
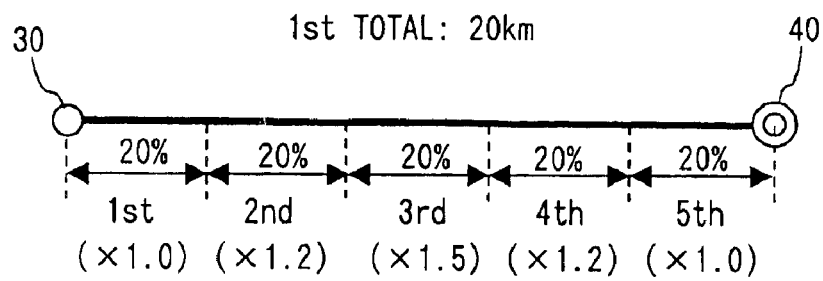
FIG. 12 is a table showing cost change target roads according to a first modification of the embodiment.
FIG. 13 is a table showing a list for designating cost change target roads according to a second modification of the embodiment.
FIG. 14 is a diagram showing a first recommended route being divided according to a third modification of the embodiment.

As another method for designating a road for cost changing, the cost changing can be executed only for roads that are ranked within a given n-th order in descending order of the traveling length. For instance, as shown in FIG. 12, roads having the first and second longest traveling lengths are designated as cost change target roads. A given multiplying coefficient is multiplied by the costs of the roads designated as the cost change target roads to change the costs. When a certain road having an enormously long traveling length is included in the first recommended route, the certain road tends to be eliminated in re-computation of the first recommended route.

Second Modification

In the embodiment, at Step 400 in FIG. 3, cost changing is executed for a road that occupies the given percentage or more of the entire traveling length of the first recommended route. However, there is a case where the start point or the destination is located on a road having the longest traveling length among roads constituting the first recommended route. Here, cost changing is executed for the road having the greatest traveling length, so that route around the start point or the destination may be changed in re-computation. This sometimes dissatisfies the user. It can be thereat designed that the road whose cost is to be changed can be designated by the user. A given coefficient is thereby multiplied by the cost of the designated road to change the cost.

Namely, at Step 400 in FIG. 3, as shown in FIG. 13, a list of roads is shown on the display unit 10 so that the user can designate a road whose cost is to be changed (target for being avoided in FIG. 13). Here, when all the roads constituting the first recommended route cannot be shown on a display of the display unit 10, the list can be designed as being scrolled or being included in another page. A given multiplying coefficient is multiplied by the costs of the roads designated by the user to change the costs. By using the changed costs, re-computation of the first recommended route is executed, so that a route meeting purpose of the user can be set.

Third Modification

In the embodiment, at Step 200 in FIG. 3, the first recommended route is divided by using the road names. However, when the traveling length of the route is short, the first recommended route cannot divided by using any road attributes of the above-mentioned road name, road kind, road number, and link ID sequence.

In this case, the first recommended route can be divided into plural sections (a section sub-group) by using a given divisor. A coefficient for each divided section can be determined based on a distance from the linear center (or center of a traveling length) of the first recommended route, so that re-computation of the first recommended route is executed by using costs that are multiplied by the coefficients. Processing in a case where the first recommended route cannot be divided by using a road attribute will be explained with reference to FIG. 14, 15. Here, Steps 100, 200, 300, 400 in FIG. 15 are the same as in FIG. 3 of the embodiment, so that explanation for them will be eliminated below.

Figure 15:
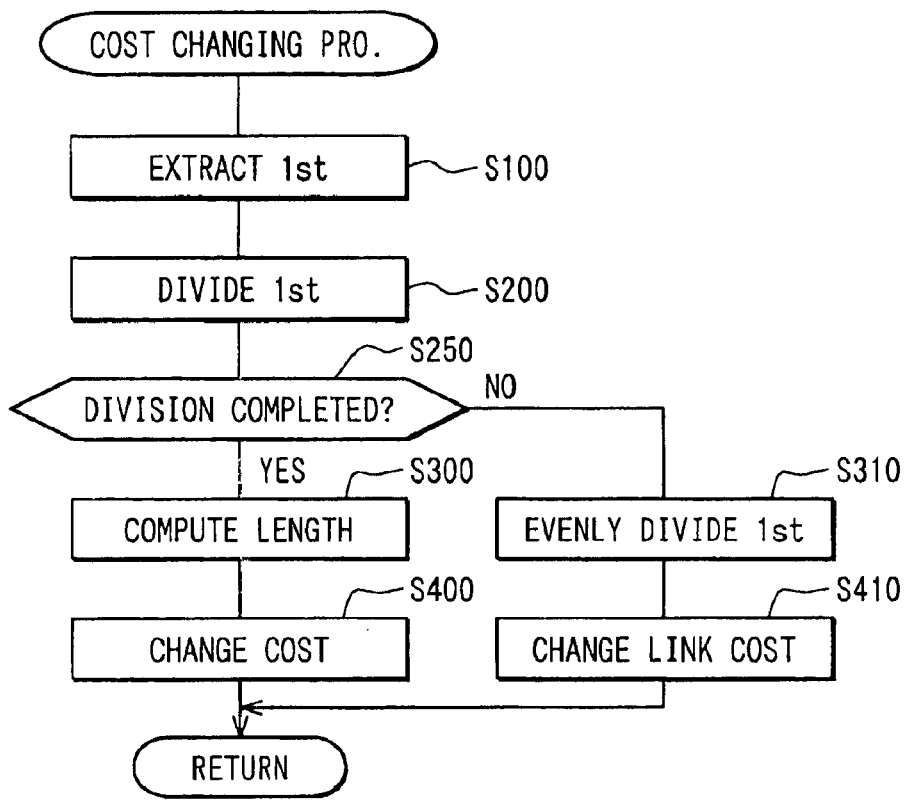
FIG. 15 is a flowchart diagram explaining cost changing processing according to a third modification of the embodiment.

At Step 250 in FIG. 15, it is determined whether division at Step 200 is completed by using any road attribute of the road name, road kind, road number, and link ID sequence. When the division is determined to be completed, the processing proceeds to Step 300, the above-mentioned processing is executed. By contrast, when the division is determined to be not completed, the processing proceeds to Step 310.

At Step 310, the first recommended route is divided by a given divisor. The divisor can be determined by the user or based on the entire traveling length of the first recommended route. In this modification, as shown in FIG. 14, the first recommended route is substantially evenly divided into five sections (20% portions). When a divided point is located within a link, the divided point is favorably shifted to either start or end point of the link.

At Step 410, among the divided sections, the third section where the linear center of the first recommended route is located is designed as having the maximum coefficient (e.g., 1.5). The second and fourth sections are designed as having a certain coefficient (e.g., 1.2), while the first and fifth sections are designed as remaining without being changed, namely as having a coefficient of 1.0. Costs are thereby changed by using the above coefficients to execute re-computation of the first recommended route.

This enables the first recommended route to be divided even when any road attribute is unavailable for dividing the first recommended route. In addition, in re-computation of the first recommended route, a road that is located around the linear center between the start point and the destination can be clearly avoided.

Fourth Modification

In the embodiment, at Step 200 in FIG. 3, the first recommended route is divided by using the road names. However, the first recommended route can be divided by a divisor inputted by the user, or the first recommended route can be divided as being traveling length ratios determined by the user. Furthermore, in the embodiment, at Step 400 in FIG. 3, a road is designated for cost changing. However, coefficients for the respective divided sections can be determined by the user, so that re-computation of the first recommended route is executed by using the determined coefficients.

Figure 16A:
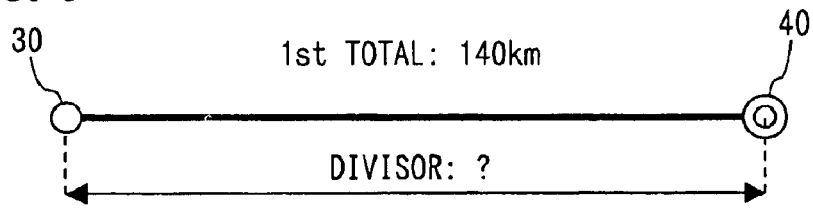
FIGS. 16A to 16C are diagrams showing a first recommended route on a display unit according to a fourth modification of the embodiment.
Figure 16B:
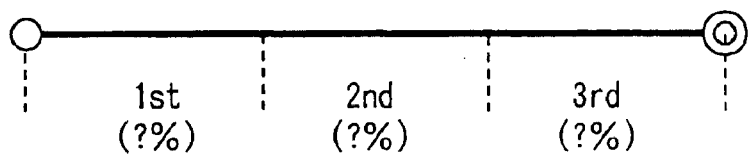
Figure 16C:
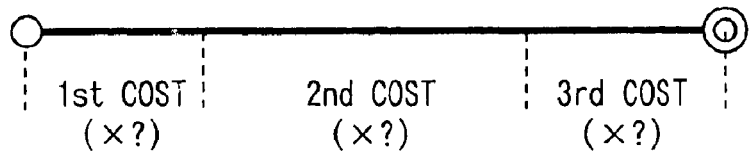

For instance, as shown in FIG. 16A, an outline of the first recommended route is shown on the display unit 10 to ask the user for inputting a divisor. When the user inputs the divisor, the first recommended route being divided into sections by the inputted divisor is shown to ask the user for inputting traveling length ratios of the respective sections as shown in FIG. 16B. When the user inputs the traveling length ratios, the first recommended route being divided into the sections with the traveling length ratios inputted by the user is shown on the display unit 10 so as to ask the user for inputting coefficients for the links included in the respective sections as shown in FIG. 16C. When the coefficients for the respective sections are inputted, re-computation of the first recommended route is executed by multiplying the costs of the links of each section by the corresponding coefficient.

Thus, the user can determine the divisor, traveling length ratios, and coefficients for links of each divided section, so that the re-computed route can meet a purpose of the user. Here, all the divisor, traveling length ratios, and coefficients are determined by the user, but it is also designed that at least one of them can be determined by the user.

Furthermore, at least one of the divisor, traveling length ratios, and coefficients can be automatically determined based on the entire traveling length of the first recommended route without user's input.

For instance, when the entire traveling length is relatively long, increasing a divisor can be effective in meticulously setting cost changing in the divided sections. Furthermore, a coefficient can be increased for increasing the costs of the links that are located around the linear center of the recommended route. By contrast, a coefficient can be decreased for decreasing the costs of the links that are located near the start point or the destination of the recommended route. Thus, according to the entire traveling length of the recommended route, a divisor for the route or a coefficient can be changed so that a major road that is included around the linear center of the recommended route can be avoided from being included in a re-computed recommended route in re-computation of the recommended route.

Furthermore, when the entire traveling length is relatively short, a traveling length ratio can be decreased around the linear center of the recommended route, while it can be increased around the start point or the destination of the recommended route. Meticulous cost changing can be thereby possible around the linear center of the recommended route. This results in easily changing a route around the linear center of the recommended route.

It will be obvious to those skilled in the art that various changes may be made in the above-described embodiments of the present invention. However, the scope of the present invention should be determined by the following claims.

What is claimed is:

1. A car navigation system comprising:
   a storage unit for storing
      road data, wherein the road data is constituted by a plurality of nodes and a plurality of links, each of which interconnects between the nodes, and
      a plurality of road names, each of which corresponds to each of the links;
   a computation unit for computing a recommended route from a start point to an end point by using link costs that are assigned to the individual links, wherein the recommended route is constituted by recommended links among the plurality of links, so that a total of link costs possessed by the recommended links is a minimum among totals of link costs included in routes from the start point to the end point, wherein routing assistance from the start point to the end point is executed according to the recommended route,
   a re-computation command unit for commanding re-computation of the recommended route; and
   a cost change unit for increasing a link cost possessed by each link of a same-road-name group including at least two links, wherein the each link of the same-road-name group has a same road name, when the re-computation command unit commands the re-computation of the recommended route,
   wherein the computation unit executes re-computation of the recommended route by using the link costs increased by the cost change unit.

2. The car navigation system of claim 1,
   wherein the cost change unit increases the link cost possessed by the each link of the same-road-name group,
   by multiplying the link cost by a coefficient that is set based on a total of link lengths that correspond to the links included in the same-road-name group.

3. The car navigation system of claim 1,
   wherein the cost change unit increases the link cost possessed by the each link of the same-road-name group,
   only when a total of link lengths that correspond to the links included in the same-road-name group is a given length and more.

4. The car navigation system of claim 1, further comprising:
   a road designation unit for designating at least one road,
   wherein the cost change unit increases a link cost possessed by each link that is included in the at least one road.

5. The car navigation system of claim 1,
   wherein the re-computation command unit commands re-computation responsive to a user request.

6. The car navigation system of claim 1,
   wherein identifiers are assigned in serial to adjacent links of a same-road-name group, and wherein the computation unit utilizes the identifiers in computing the recommended route.

7. The car navigation system of claim 1,
   wherein the cost change unit increases a link cost responsive to selection by a user.

8. A car navigation system comprising:
   a storage unit for storing
      road data, wherein the road data is constituted by a plurality of nodes and a plurality of links, each of which interconnects between the nodes, and
      a plurality of road kinds, each of which corresponds to each of the links;
   a computation unit for computing a recommended route from a start point to an end point by using link costs that are assigned to the individual links, wherein the recommended route is constituted by recommended links among the plurality of links, so that a total of link costs possessed by the recommended links is a minimum among totals of link costs included in routes from the start point to the end point, wherein routing assistance from the start point to the end point is executed according to the recommended route,
   a re-computation command unit for commanding re-computation of the recommended route; and a cost change unit for increasing a link cost possessed by each link of an same-road-kind group including at least two links, wherein the each link of the same-road-kind group has an same road kind, when the re-computation command unit commands the re-computation of the recommended route, wherein the computation unit executes re-computation of the recommended route by using the link costs increased by the cost change unit.

9. The car navigation system of claim 8, wherein the cost change unit increases the link cost possessed by the each link of the same-road-kind group, by multiplying the link cost by a coefficient that is set based on a total of link lengths that correspond to the links included in the same-road-kind group.

10. The car navigation system of claim 8, wherein the cost change unit increases the link cost possessed by the each link of the same-road-kind group, only when a total of link lengths that correspond to the links included in the same-road-kind group is a given length and more.

11. The car navigation system of claim 8, further comprising:

a road designation unit for designating at least one road, wherein the cost change unit increases a link cost possessed by each link that is included in the at least one road.

12. The car navigation system of claim 8, wherein the re-computation command unit commands re-computation responsive to a user request.

13. The car navigation system of claim 8, wherein the cost change unit increases a link cost responsive to selection by a user.

14. A car navigation system comprising:

a storage unit for storing
  road data, wherein the road data is constituted by a plurality of nodes and a plurality of links, each of which interconnects between the nodes, and
  a plurality of road numbers, each of which corresponds to each of the links;

a computation unit for computing a recommended route from a start point to an end point by using link costs that are assigned to the individual links, wherein the recommended route is constituted by recommended links among the plurality of links, so that a total of link costs possessed by the recommended links is a minimum among totals of link costs included in routes from the start point to the end point, wherein routing assistance from the start point to the end point is executed according to the recommended route, a re-computation command unit for commanding re-computation of the recommended route; and a cost change unit for increasing a link cost possessed by each link of an same-road-number group including at least two links, wherein the each link of the same-road-number group has an same road number, when the re-computation command unit commands the re-computation of the recommended route, wherein the computation unit executes re-computation of the recommended route by using the link costs increased by the cost change unit.

15. The car navigation system of claim 14, wherein the cost change unit increases the link cost possessed by the each link of the same-road-number group, by multiplying the link cost by a coefficient that is set based on a total of link lengths that correspond to the links included in the same-road-number group.

16. The car navigation system of claim 14, wherein the cost change unit increases the link cost possessed by the each link of the same-road-number group, only when a total of link lengths that correspond to the links included in the same-road-number group is a given length and more.

17. The car navigation system of claim 14, further comprising:

a road designation unit for designating at least one road, wherein the cost change unit increases a link cost possessed by each link that is included in the at least one road.

18. The car navigation system of claim 14, wherein the re-computation command unit commands re-computation responsive to a user request.

19. The car navigation system of claim 14, wherein identifiers are assigned in serial to adjacent links of a same-road-number group, and wherein the computation unit utilizes the identifiers in computing the recommended route.

20. The car navigation system of claim 14, wherein the cost change unit increases a link cost responsive to selection by a user.

* * * * *